United States Patent

[11] 3,610,946

[72] Inventor Thomas L. Osborne
Holmdel, N.J.

[21] Appl. No. 821,399
[22] Filed May 2, 1969
[45] Patented Oct. 5, 1971
[73] Assignee Bell Telephone Laboratories Incorporated
Murray Hill, N.J.

[54] BROADBAND VARACTOR UPCONVERTER
8 Claims, 8 Drawing Figs.

[52] U.S. Cl. .......... 307/88.3, 325/443, 325/445, 325/449
[51] Int. Cl. .......... H03f 7/04
[50] Field of Search .......... 307/88.3; 330/4.9; 325/445, 449, 442, 443

[56] References Cited

UNITED STATES PATENTS

| | | | |
|---|---|---|---|
| 3,169,227 | 2/1965 | Closson | 330/4.9 |
| 3,353,031 | 11/1967 | Abel | 307/88.3 |
| 3,517,209 | 6/1970 | Abel | 307/88.3 |

OTHER REFERENCES

Brenner, " IEEE Transactions on Microwave Theory and Techniques," May 1967, pp. 290–294.330–4.9

*Primary Examiner*—Roy Lake
*Assistant Examiner*—Darwin R. Hostetter
*Attorneys*—R. J. Guenther and E. W. Adams, Jr.

ABSTRACT: In a varactor upper sideband upconverter a frequency-dependent impedance mismatch between the constant impedance of the signal source and the inherently frequency-dependent impedance of the varactor upconverter is used to regulate the power into the upconverter so that the ratio of the varactor output power to the available power of the signal source is constant.

INVENTOR
T. L. OSBORNE
BY Ray M. Porter Jr.
ATTORNEY

BROADBAND VARACTOR UPCONVERTER

BACKGROUND OF THE INVENTION

This invention relates to upconverter amplifiers, and more particularly to means for broadbanding a varactor upconverter so that, over a bandwidth which is a substantial percentage of the IF frequency, the output power versus frequency characteristics is essentially flat for a constant available IF input power.

In many microwave radio systems the transmitted microwave signal is obtained by frequency converting an IF signal in a mixer or modulator and amplifying it in a microwave power amplifier, such as a traveling wave tube, to a power level set by system requirements. By use of a varactor diode upconverter as a microwave power amplifier, the functions of frequency conversion and amplification can be performed by one device. Therefore, for broadband microwave radio systems, efficient broadband varactor converters are highly desirable as power amplifiers.

Varactor upconverters are, however, inherently narrow band devices. Due to the residual reactance intrinsic to the IF circuit, the Q of the load seen by the IF source is high for typical circuit parameters, and hence the bandwidth is narrow. Simply altering the values of the reactive elements to reduce the Q (and increase the bandwidth) is not possible since they are essentially determined by the physical structure of the diode and the IF filtering requirements.

Resistive loading has been used to create broad bandwidths at the cost of increased loss. The increased bandwidth, however, brings a secondary effect into importance. As was shown by Manley & Rowe in an article entitled "Some General Properties of Nonlinear Elements—Part I. General Energy Relations, " in Proceedings of the IRE, Volume 44, July 1956, such devices are characterized by an inverse gain-frequency relation which produces a theoretical 3 db. tilt in the output characteristic of the pump frequency is significantly larger than the IF signal frequency. For narrow band operation, this tilt is of minimal concern as, over the operating bandwidth, an insignificant loss of output power results and the bandwidth limitation dominates the inverse gain-frequency effect. In the broadband case, however, the loss of gain becomes significant and resistive loading to obtain broadband operation does nothing the compensate for this undesirable decrease in output power.

SUMMARY OF THE INVENTION

It is an object of the present invention to provide means for broadbanding upconverter-amplifiers, and more specifically to provide a varactor upconverter in which compensation for the inverse gain-frequency relation results in a constant ratio of output power to available signal source power.

In accordance with the invention, the inherently frequency-dependent IF input impedance of the varactor is used to regulate the power into the upconverter. An impedance mismatch is provided between the signal source and the upconverter resulting in a frequency-dependent mismatch loss over the operating band. The resultant combination of the frequency variation of the actual IF signal power transferred to the upconverter and the inverse gain versus frequency characteristic produces a broadband output for which the ratio of output power to available signal power remains constant at the cost of reducing IF to RF gain.

The mismatch at the signal source-upconverter interface in the IF circuit is provided by means of a properly chosen impedance transformer. In this manner the device is made to operate on the lower (positive) slope of the IF transfer characteristic of available power to upconverter input power, and the secondary inverse gain-frequency effect compensates exactly for the slope over a broadband. The secondary effect is, of course, thus eliminated and in addition the compensation gives an output characteristic theoretically totally independent of frequency over the operating band. Broadbanding by modifying the IF circuit in this manner produces advantages over resistive loading in that greater gain can be obtained for the same bandwidth and the secondary gain-frequency effect is overcome producing a truly flat output characteristic.

In addition to an IF circuit, the upconverter also requires an RF circuit which consists of pump and output signal filters, tuning sections for matching pump and output RF signals, and a diode assembly common to the IF circuit. In a preferred embodiment the diode assembly includes an adjustable chuck capacitance in shunt with the diode formed by an adjustable sleeve concentric with the diode cartridge. This mechanism allows impedance transformation without the need for reduced height waveguide and associated transitions and permits the pump and output signal filters to be close to the diode with a corresponding reduction in bandshape ripples.

DETAILED DESCRIPTION

Figure 1:
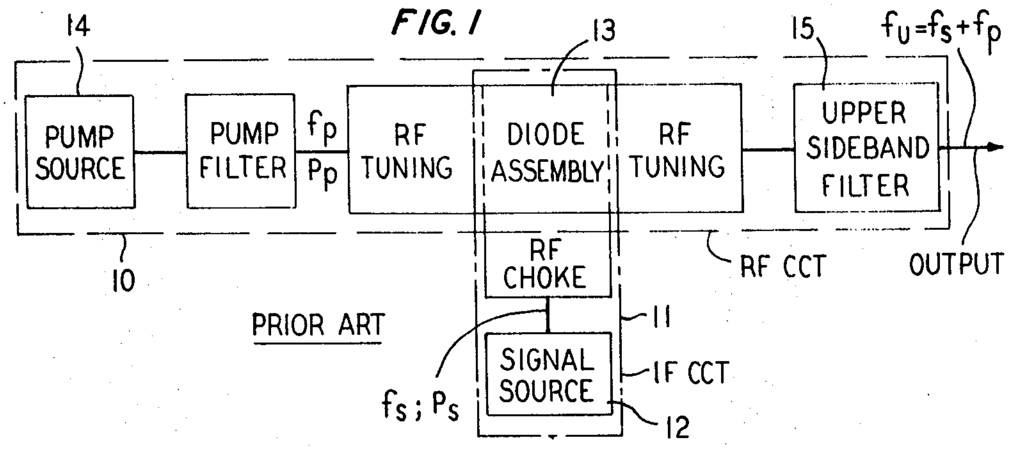
FIG. 1 is a block diagram of a conventional upconverter assembly.

The block diagram of FIG. 1 presents the functional elements of an upper sideband upconverter. Circuit 10 designed for the pump and output signals is designated the RF circuit because the pump and output frequencies are normally substantially higher than the signal frequency which will be referred to as IF. The IF input signal from source 12 is fed to diode assembly 13 along with the pump signal from pump source 14. Where the input and pump frequencies are designated $f_s$ and $f_p$, respectively, the mixing, which may be performed by various nonlinear elements such as a varactor diode, results in an output product with frequency, $f_u=f_s+f_p$, among others. Only $f_u$ is passed by filter 15 so that the output is essentially the input signal upconverted from $f_s$ to $f_u$.

As is well known, a varactor diode upconverter produces gain as well as frequency conversion. If power $P_p$ of the pump signal and power $P_s$ of the input signal are both introduced to the varactor, the resultant power $P_u$ may be larger than the smaller of the powers $P_s$ or $P_p$. Since the input signal is normally of the lowest power and lowest frequency, the output is an amplified as well as upconverted reproduction of the input.

If $P_s$ and $P_u$ represent the power actually going into and out of the varactor diode, the well-known relations derived in the above-mentioned article by Manley & Rowe indicate that $$\frac{P_u}{P_s}=\frac{f_u}{f_s}=\frac{f_p+f_s}{f_s}=1+\frac{f_p}{f_s}. \qquad (1)$$

Figure 5:
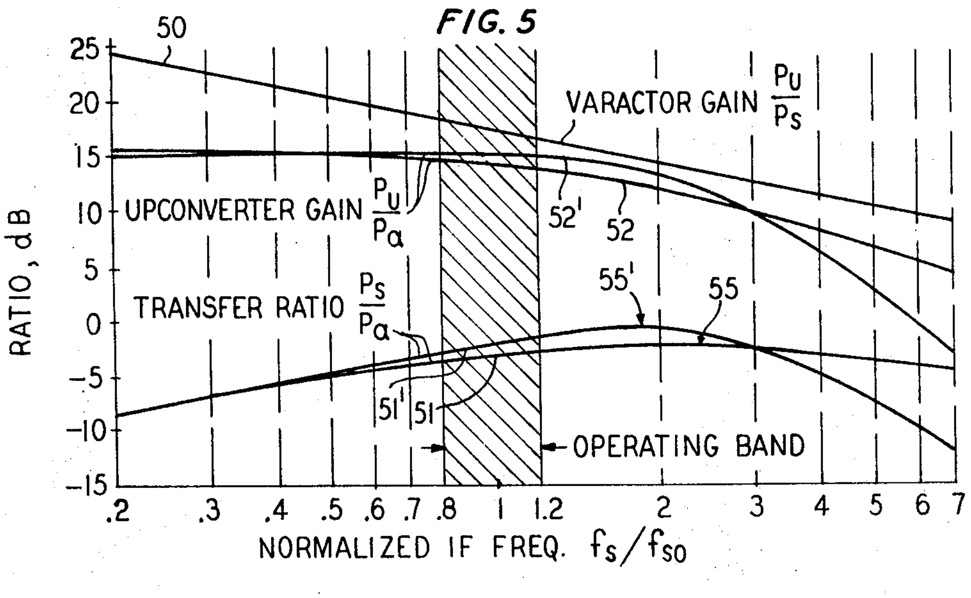
FIG. 5 illustrates, graphically, combinations of power ratios to form total upconverter gain characteristics in accordance with the invention.

Since $f_p$ is usually much larger than $f_s$, the relationship is essentially $P_u/P_s \approx f_p 1 f_s$; and where $P_s$ and $f_p$ are constant as is conventionally true, $P_u$ varies inversely with $f_s$ at the theoretical rate of 3 db. decrease in power per octave increase in frequency. This gain $P_u/P_s$ versus frequency $f_s$ characteristic of the varactor upconvertor is undesirable in a wideband amplifier as it creates a decrease in output power by one-half for each octave increase in frequency across the IF band. In accordance with the invention this inverse gain-frequency characteristic, illustrated as curve 50 in FIG. 5 is eliminated by improving IF input circuit 11.

Figure 2:
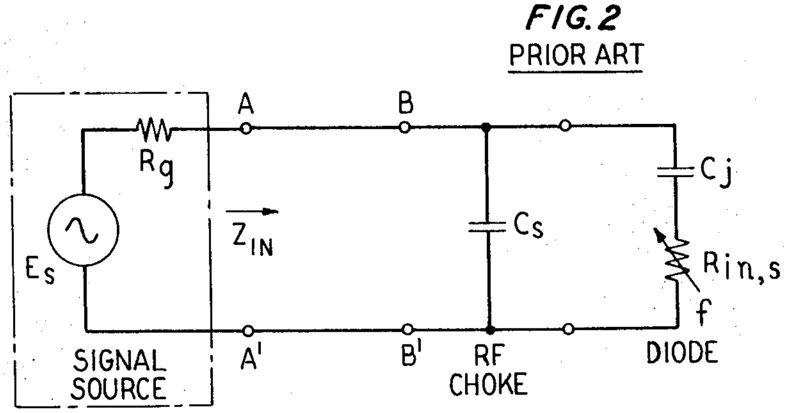
FIG. 2 PRIOR ART
FIG. 2 is a schematic diagram of the IF circuit of the assembly of FIG. 1.

A simplified equivalent schematic diagram of IF circuit 11 is shown in FIG. 2. The signal source is represented by voltage source $E_s$ and series generator resistance $R_g$; shunt capacitance $C_s$ is equivalent to all of the capacitance in parallel with the diode; and the diode is depicted as average junction capacitance $C_j$ and frequency variable input resistance $R_s$.

Conventionally, the IF input circuit is designed so that the device operates at the available source power $P_a$, where $P_a$ is defined as the power provided by the source when the source and its load are perfectly matched. Hence, impedance $Z_{in}$, which has a resistance and a capacitive reactance part, is matched by including in the circuit a balancing inductive and equating $R_g$ to $R_s$ at the center frequency $f_{so}$. For any given source, $P_a$ is the maximum power than can be transferred to the upconverter and it is delivered when the conditions of perfect match exist.

An analysis of such a matched circuit indicates that the Q (series reactance to series resistance at a center frequency $f_{so}$) of the load is on the order of 10, and the corresponding bandwidth, which is inversely related to Q will be on the order of 10 percent of the IF frequency for common parameters. This inherently narrow band is caused by the shunt capacitance $C_s$ which limits the high-frequency response and the diode junction capacitance $C_j$ which limits the low-frequency response giving a band-pass type characteristic.

To broaden the bandwidth, $C_s$ should be smaller and $C_j$ larger. However, as $C_s$ is primarily the capacitance of the RF choke which is required to isolate the IF circuit from the RF, it is not likely that its value can be significantly reduced. To increase $C_j$ would require a physically different diode and such a modification would necessitate a complete redesign of the RF circuit. Therefore, the situation cannot be easily improved by changing the circuit parameters.

In accordance with the present invention, the compensation for the inverse gain-frequency characteristic is based upon another inherent property of the varactor. The resistive part $R_{in,s}$ of the diode impedance exhibits an inverse variation with frequency $f_s$. If $R_{in,s}$ were fixed i.e., not frequency variable, the power transfer ratio $P_s/P_a$ would have a band-pass characteristic determined by the load circuit which would exhibit 6 db. band edge slopes. However, the inverse frequency dependence of $R_{in,s}$ produces a bandpass characteristic having only 3 db. band edge slopes. This characteristic is illustrated, for example, by curve 51 in FIG. 5.

Figure 4:
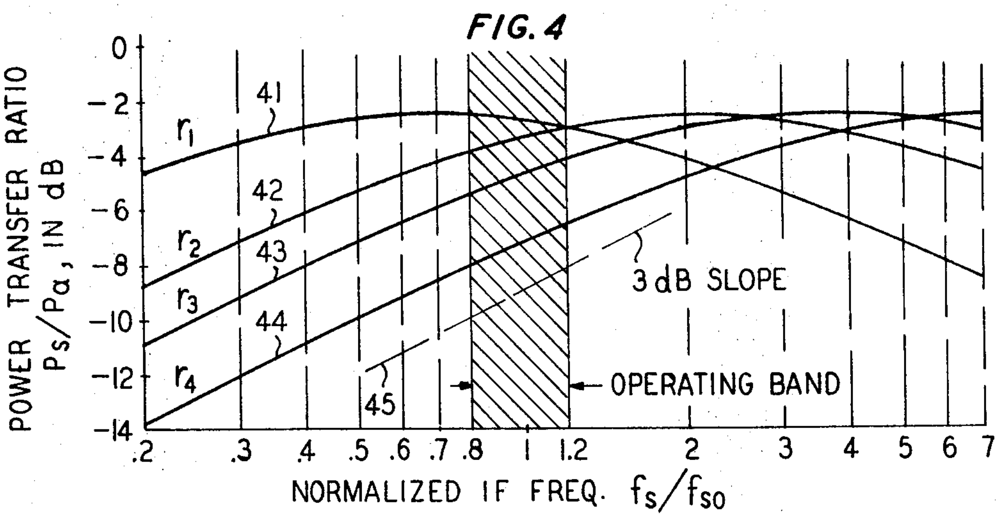
FIG. 4 illustrates a family of curves of power transfer characteristics of the circuit of FIG. 3.

By providing the properly chosen input impedance transformation, between terminals A—A' and terminals B—B' the peaks of the power transfer ratios can be shifted to higher frequencies as illustrated by curves 41 to 44 in FIG. 4, and as a result the lower positive sloping band edge will occupy the operating band. Under this condition the power transfer ratio and the varactor gain characteristic shown as curves 51 and 50, respectively in FIG. 5 can be combined to give an overall flat upconverter gain characteristic $P_u/P_a$ within the operating band, as illustrated by curve 52.

Figure 3:
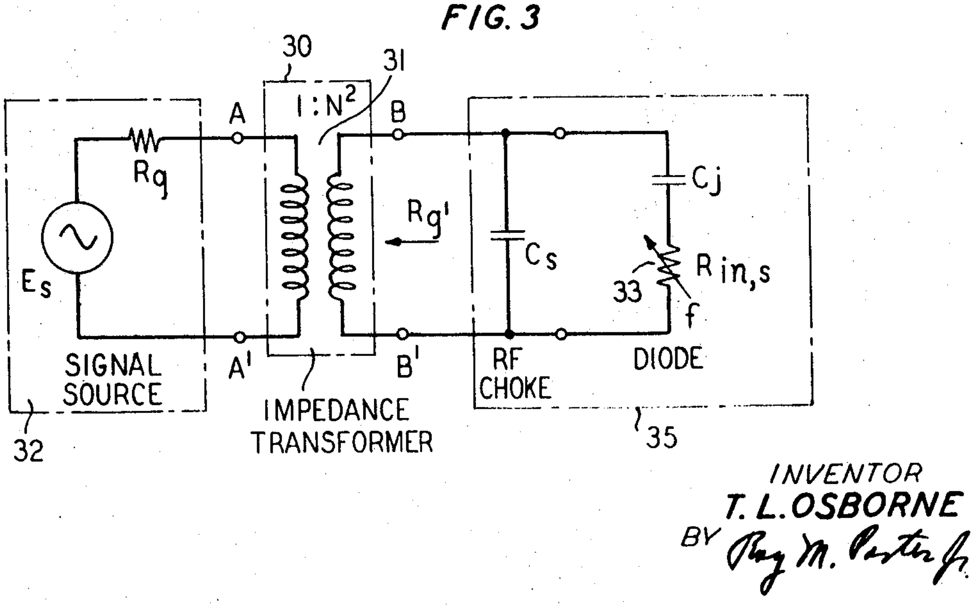
FIG. 3 is a schematic diagram of an IF input circuit in accordance with the invention.

FIG. 3 illustrates an IF input circuit which provides a broadband response in accordance with the invention. If a conventional upconverter such as illustrated in FIG. 2 is to be broadbanded, the operating power levels, operating frequencies, and diode parameters are predetermined. Therefore, it is assumed that prior considerations have fixed the values of $R_{in,s}$, $C_j$, $C_s$, $R_g$ and $f_{so}$. The following graphical procedure illustrates how to determine that mismatch which will broadband a circuit having these predetermined values.

Impedance transformer 30 may be, for example, a transformer such as transformer 31 which is defined by its turns ratio $1{:}N^2$, where $$N^2 = R'_g / R_g \qquad (2)$$

where $R'_g$ is the resistance looking into the source from terminals B—B'.

Transformer 30 must provide a substantial impedance mismatch between the source impedance (essentially $R_g$ which is frequency independent) and the load impedance (essentially therefore $R_{in,s}$ which is frequency dependent) within the operating band. The mismatch loss controls the power transferred from terminals A—A' to $R_{in,s}$ of choke-diode combination 35 and a specific value of $R'_g$ results in the ratio of upconverter output power $P_u$ relative to available source power $P_a$ being maintained constant over a broad operating band of frequency $f_s$ and the specified value of $R'_g$ will be below the value of $R_{in,s}$ at the center frequency $f_{so}$. The desired $R'_g$ may be implemented by transformer 31 in which $N^2$ is defined by equation (2).

Ignoring the effect of all inductance in the input circuit of FIG. 3 an analytical equation is derived for the power transfer ratio of the transferred power $P_s$ into and dissipated by the frequency-dependent resistance 33 ($R_{in,s}$) to the available power $P_a$ of source 32. A useful parameter is:

$$r = R_o / R'_g \qquad (3)$$

where $R_o$ is the value of $R_{in,s}$ at center frequency $f_{so}$.

The operating band over which a constant ratio $P_u/P_a$ is desired is crosshatched in FIGS. 4 and 5. A family of curves are drawn as in FIG. 4 in which the power transfer ratio $P_s/P_a$ is plotted as a function of normalized IF frequency $f_s/f_{so}$ in which each curve has a different value of parameter $r$. Curves 41 through 44 represent power transfer ratios for increasing $r$'s as $r_1<r_2<r_3<r_4$. It can be seen that as $r$ increases, the peak of the curve moves toward a higher frequency and that, as discussed above, the linear portion of the curve which lies below the peak frequency is sloped upward at approximately 3 db. per octave. Curve 45, having a 3 db. slope, is indicated for comparison.

A value of $r$ is chosen for which the curve having that $r$ best meets two conditions. Since the two conditions are mutually exclusive to some degree, the exact value of $r$ will depend upon which is most important in a given situation. The selected $r$ shall exhibit an approximate 3 db. upward slope in the operating band and the level of power transfer ratio should be as high as possible in that band. Curve 42, corresponding to $r_2$ would be a reasonable compromise among the curves shown in FIG. 4, for example.

Having chosen $r$ the value of $R'_g$ is found from equation (3), thereby determining the value of $N^2$ from equation (2). Transformer 31, having the appropriate turns ratio, may provide the desired mismatch in a conventional manner.

The resultant total upconverter gain characteristic 52 in FIG. 5 will be nominally flat within the operating band. Curve 52 results from a direct combination of curves 50 and 51, which are plots of varactor gain $P_u/P_s$ and transfer ratio $P_s/P_a$ versus frequency respectively. (Curve 51 is the selected curve 42 from FIG. 4.) Since $$P_u/P_s \times P_s/P_a P_u/P_a \qquad (4)$$

curves 50 and 52 may be added graphically where the ratios are plotted in db.

Figure 7:
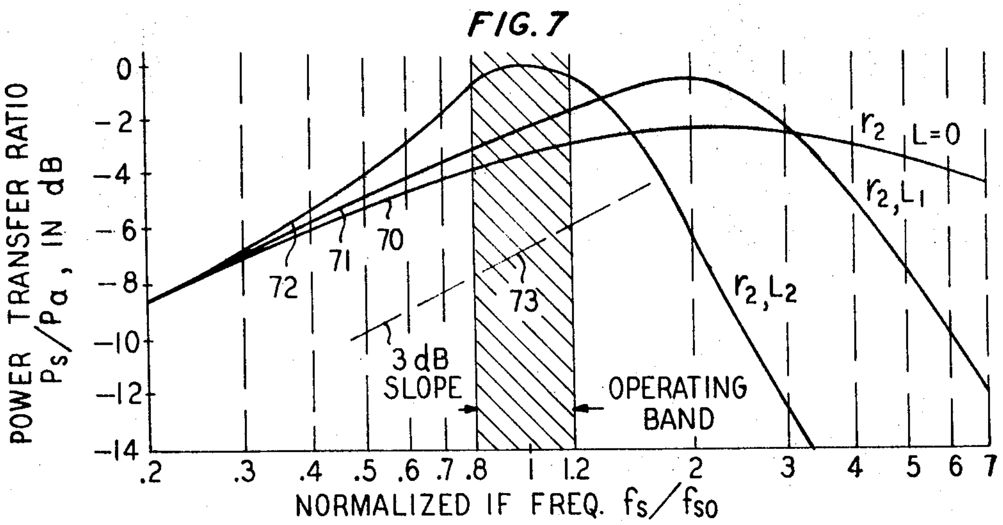
FIG. 7 illustrates a family of curves of power transfer characteristics of the circuit of FIG. 6.
Figure 6:
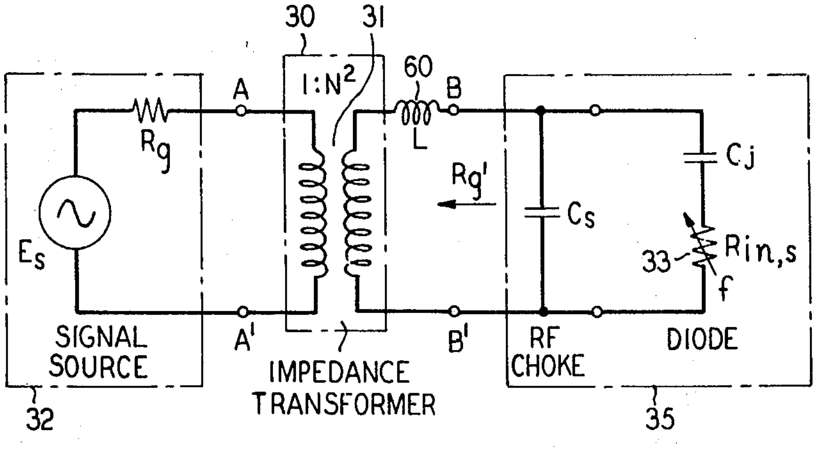
FIG. 6 is a schematic diagram of a modified IF input circuit of FIG. 3.

An additional procedure provides for the inclusion of a quantity of inductance in the IF input circuit and results in improved response over the case of zero inductance assumed above. FIG. 6 shows a circuit of FIG. 3 with a lumped inductance 60, designated L, inserted serially between transformer 31 and terminal B. Following the procedure described above, an appropriate $r$ is determined. In FIG. 7, curve 70 represents the case of selected $r_2$ and L=0 (curve 42 of FIG. 4). In addition, curves 71 and 72 represent plots of transfer ratios for $r_2$ with increasing values of L, as $L_1<L_2$. Inductance 60 is used to decrease the loss at the peak of the response as can be seen by comparing curves 70, 71 and 72. Inductance 60 also presents an open circuit to those frequencies in the diode which are below the rejection band of the RF choke, but the value of L cannot be too large or it will resonate with the input capacitance and cause a narrow band response, as indicated by curve 72.

FIG. 7 illustrates the effect of the value L of inductance 60 on the transfer characteristic. It is noted that with an increase in the value of L over the L=0 case of curve 70, curve 71 exhibits both improved slope and power transfer ratio over the operating band, However, if L is made too large, the transfer ratio such as is represented by curve 72, for example, does not have the required 3 db. slope as seen by comparison with the 3 db. slope curve 73.

Curve 71 is selected from the family of curves of FIG. 7 and is plotted in FIG. 5 as curve 51', and when combined with curve 50, as indicated above with regard to the combination of curves 50 and 51, produces a resultant total upconverter gain characteristic 52' which has a higher power level in the operating band than the output of curve 52, produced in the L=0 case.

In many cases the value of $R_g$ is available as a parameter and it may therefore not be necessary to use transformer 30 to provide the mismatch. The above-described procedure can be used considering N=0 (i.e., a direct connection between terminals A—A' and terminals B—B') and the mismatch may be provided by selecting $R_g$ to be equal to $R'_g$.

In many cases where transformer 30 is necessary, inductance 60 may be derived from the inherent inductance of a transformer such as 31. It is also noted that some generalized low-pass filter type circuits can be synthesized which perform essentially the same function as inductance 60 but improve the performance by extending the range of the 3 db. per octave slope by giving a sharper cutoff.

The bandwidth and amplification characteristics of an upconverter having an IF circuit as shown in FIG. 3 or 6 can be summarized by reference to FIG. 5. The operating band, as indicated in FIG. 5 is 40 percent of the IF center frequency and extends from 0.8 to 1.2 times the center frequency $f_{so}$ or, for example, from 240 MHz to 360 MHz for a center frequency of 300 MHz. Thus, for a pump frequency of 10.460 GHz, for example, the output band would extend from 10.70 (10.46+0.240) to 10.820 GHz (10.46+0.360) and hence the output bandwidth would be 120 MHz or 40 percent of the IF frequency which is herein referred to as broadband.

Within the operating band the power transfer ratios of the circuits of FIGS. 3 and 6, represented by curves 51 and 51' respectively, indicate that impedance transformer 30 provides a mismatch which controls the power delivered from source 32 to choke-diode combination 35 so that the transferred power increases with IF frequency at the same rate as the inherent gain of the upconverter, represented by curve 50, decreases with IF frequency. Maximum power transfer is indicated at points 55 and 55' and by virtue of the above-described design procedure defining the characteristics of transformer 30, these maximum power transfer points are substantially above the operating band.

If the parameters of the circuit of FIG. 6 without regard to transformer 30 provide a perfect match, then by incorporation of transformer 30, this perfect match is shifted to point 55' and the broadband response provided by the IF input circuit results in some loss of gain because of the mismatch within the operating band.

The resultant total gain characteristic $P_u/P_a$ represented by curves 52 or 52' is almost perfectly flat within the operating band and hence, if the level of source available power $P_a$ remains constant, the output power $P_u$ versus frequency characteristic will be flat; and if $P_a$ changes $P_u$ will change proportionally, but the above-described broadbanding procedure results in the total gain characteristic being frequency independent within the operating band.

Figure 8:
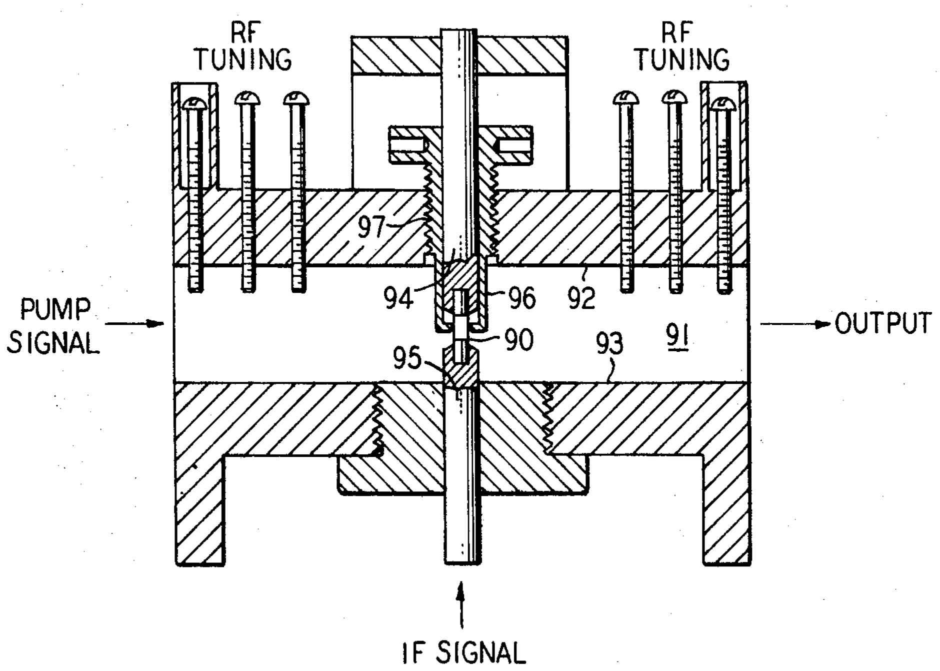
FIG. 8 is a cross-sectional view of a preferred embodiment of the diode assembly.

In order to embody the upconverter the diode must be coupled to the RF circuit as well as the IF circuit. A preferred mounting assembly is shown in the cross-sectional view of FIG. 8 in which diode 90 is physically mounted across a gap formed by two cylindrical posts 94 and 95 protruding into standard height waveguide 91 from opposite broad walls 92 and 93. Post 95 is a conventional diode chuck and also the center conductor of the coaxial RF choke through which the IF signal is supplied. Post 94 is a diode chuck surrounded by and in electrical contact with conductive cylindrical sleeve 96 whose height may be adjusted by means of appropriate threading 97. A tuned capacitance which is formed by the end of sleeve 96 and the chuck of post 95, can be varied from a very small value to a very large one when sleeve 96 touches post 95.

The tuned capacitance is in shunt with the diode and it acts together with the diode self-inductance as a tuned impedance transformer. Because the capacitance shunts the diode, transformation takes place close to the diode and the effects of echo and reflection are reduced to a minimum.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

I claim:

1. A broadband upconverter comprising a pump source for providing a pump signal, a signal source for providing an input signal of a selected operating frequency band, mixing means coupled to said signal and pump sources for mixing the pump and the input signals, the gain of said mixing means varying at a substantially constant rate with the frequency of the input signal from said signal source over said operating frequency band, and means for controlling the power of the signal transferred to said mixing means from said signal source such that the power into said mixing means varies at substantially said constant rate with the frequency of the input signal over said operating frequency band, said means for controlling the power transfer being arranged so that the ratio of said output signal power to the available power of said signal source is constant over a broad band of frequencies.

2. A broadband upconverter as claimed in claim 5 wherein the gain of said mixing means varies inversely with the frequency of the input signal at said substantially constant rate over said operating band, and said means for controlling the power of the signal into said mixing means provides that the power transferred to said mixing means varies directly with the frequency at said substantially constant rate over said operating band.

3. A broadband upconverter, as claimed in claim 1 wherein said mixing means is a varactor diode and has a frequency variable input impedance, and the impedance of said signal source as seen by said varactor is constant and substantially less than the value of said variable input impedance at the center of said operating band.

4. A broadband upconverter, as claimed in claim 1 wherein said mixing means and said means for controlling power each provides a substantially constant rate of approximately 3 db. per octave with the frequency of the signal from said signal source over said operating band.

5. An upconverter as claimed in claim 1 wherein said mixing means is a cartridge diode secured across a hollow waveguide by a mounting structure and wherein said mounting structure includes a pair of coaxial conductive chucks for holding opposite ends of said diode and a conductive sleeve in movable contact with one of said pair of chucks such that the separation of said sleeve from said other of said pair of chucks is adjustable to produce a variable capacitance in shunt with said diode.

6. A broadband upconverter, as claimed in claim 1 wherein said means for controlling power includes impedance transformation means between said signal source and said mixing means for providing a mismatch in said operating frequency band.

7. A broadband upconverter, as claimed in claim 6 further including an inductance in series with said impedance transformation means.

8. A broadband upconverter as claimed in claim 9 wherein said impedance transformation means is a transformer having its primary connected to said signal source and its secondary connected to said mixing means, said transformer having a primary to secondary turns ratio $1:N^2$, where $N^2=R'_g/R_g$, $R'_g$ is the resistance looking into the secondary toward said source from said mixing means and $R_g$ is the resistance of the signal source, and said turns ratio being selected so that $R'_g$ is less than the input resistance of said mixing means at the center frequency of said operating band.

UNITED STATES PATENT OFFICE
CERTIFICATE OF CORRECTION

Patent No. 3,610,946 Dated October 5, 1971

Inventor(s) Thomas L. Osborne

It is certified that error appears in the above-identified patent and that said Letters Patent are hereby corrected as shown below:

In column 4, line 1, "therefore" should be omitted.

In claim 2, at column 6, line 30, the numeral "5" should read --1--.

In claim 2, column 6, line 36 should read "the frequency of the input signal at said substantially constant rate over said".

In claim 8, at column 6, line 67, the numeral "9" should read --6--.

Signed and sealed this 28th day of March 1972.

(SEAL)
Attest:

EDWARD M.FLETCHER, JR.
Attesting Officer

ROBERT GOTTSCHALK
Commissioner of Patents